June 22, 1954  C. O. BRUESTLE  2,681,544
CABLE STRANDING MACHINE

Filed May 28, 1953  2 Sheets-Sheet 2

Inventor:
Carl O. Bruestle
by his Attorneys,
Darby & Darby

Patented June 22, 1954

2,681,544

UNITED STATES PATENT OFFICE 2,681,544

CABLE STRANDING MACHINE

Carl O. Bruestle, Metuchen, N. J., assignor to Syncro Machine Company, Perth Amboy, N. J., a corporation of New Jersey Application May 28, 1953, Serial No. 358,067

6 Claims. (Cl. 57—65)

This invention relates to improvements in cable stranding machines of the planetary type and is particularly concerned with a construction employing a tie bar cross connecting the side members of the cradle frame, having associated therewith a safety device causing the machine to shut down in the event the tie bar breaks or unscrews.

In a construction of this type a tie bar assembly can be used in which one spool pintle is fixed to one side frame member of a cradle and the other is constructed to allow axial sliding movement. With such an arrangement a locking device is provided to lock the sliding pintle against sliding movement when the spool is in place. With such an arrangement there is always the chance that the locking device will fail or will not be set up tight enough so that the associated pintle may undesirably move axially when the machine is in operation. This represents a point of possible injury or damage and the purpose of this invention is to associate with such a mechanism a control device which will shut the machine down in the event the tie bar breaks or unscrews, thereby permitting the sliding pintle assembly to move in the event the locking device fails or is not tight enough.

In the accompanying drawings.

Figure 1:
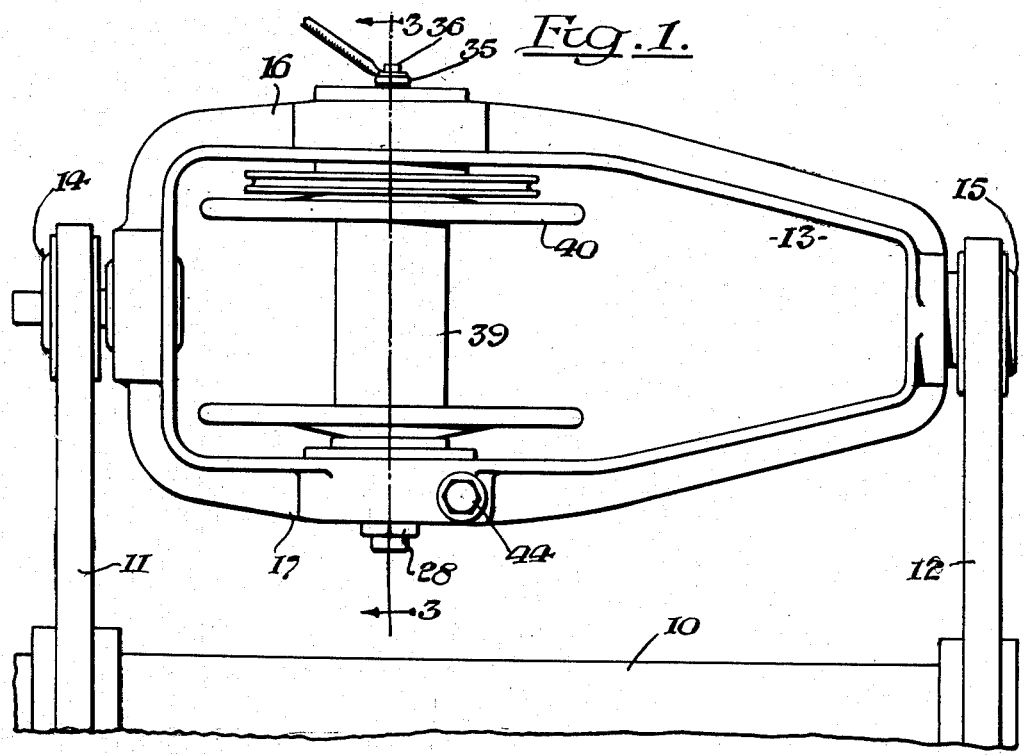
Figure 1 is a view showing one of the spool cradles in plan.

As shown in Figure 1, the machine is provided with a main or central shaft which provides the main axis of rotation about which the cradles bodily rotate. One of these cradles is shown generally at 13 and, as usual, is rotatably mounted on its longitudinal axis in suitable bearing members 14 and 15, at the ends of the arms 11 and 12, which in turn are mounted on the main rotor shaft 10 for rotation therewith. As shown in Figure 1, the cradle 13 includes the side frame members 16 and 17 in which are mounted the bearing members for rotatably supporting the strand spool 39—40 on its axis of rotation. This general construction so far described is common to the stranding machines of this type.

Figure 3:
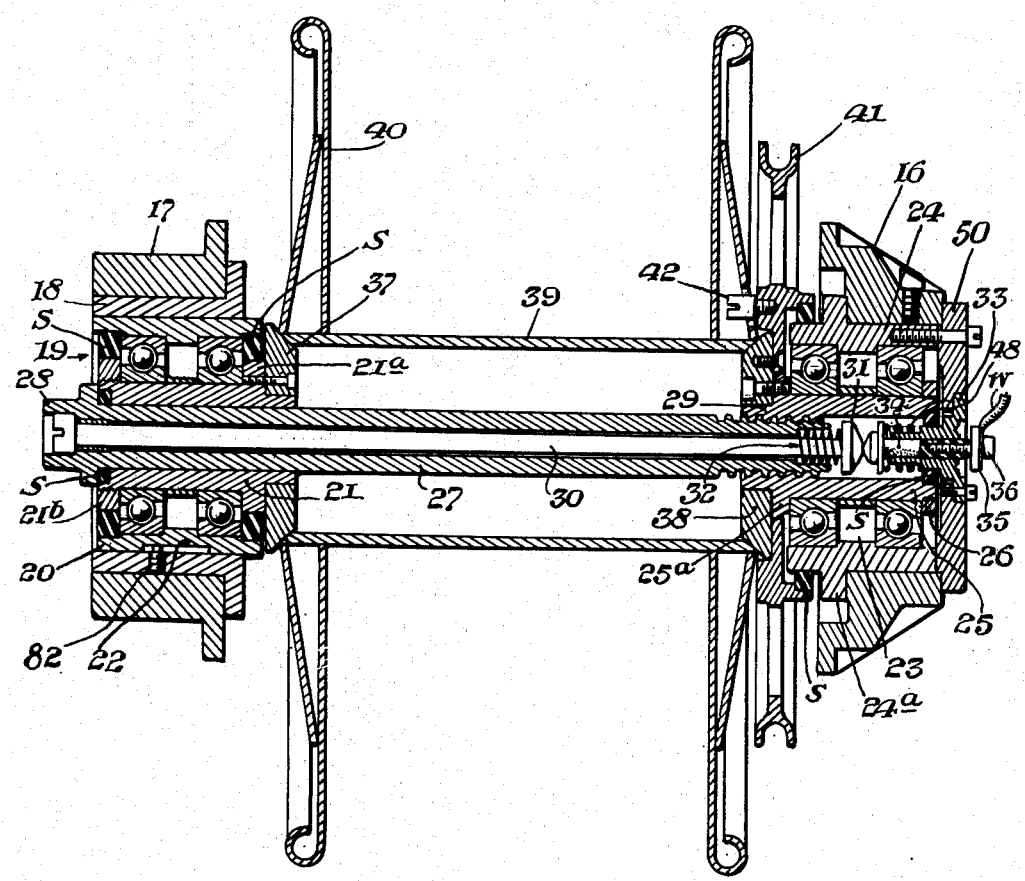
Figure 3 is a cross-sectional view taken on the line 3—3 of Figure 1.

As illustrated in more detail in Figure 3, the cradle side frame members 16 and 17 are provided with a pair of aligned openings in which are mounted the anti-friction bearing assemblies 19 and 23 respectively. These bearing assemblies are preferably of the opposed radial thrust type as shown. These bearing assemblies will, therefore, all act by use of the tie rod 27 to absorb their share of the loading of the various positions of the cradles. The bearing assembly 19 is mounted in a flanged bushing 18 which fits into a cylindrical opening in the frame member 17. The bearing assembly 19 includes an outer cylindrical race supporting member 20 and an inner cylindrical race supporting member 21. The member 20 is allowed axial movement in the bushing 18 without rotational movement by reason of the cooperation of the threaded pin 82 and slot 22, the former of which is threadedly mounted in the bushing 18 and the latter of which is formed on the surface of the member 20. The inner member 21 is provided with a flange 21ª intermediate its ends and with a threaded ring 21ᵇ by means of which the anti-friction races are locked thereon.

The anti-friction assembly 23 is mounted in the opening in the other frame member 16. It consists of an outer cylindrical bearing housing member 24 and an inner cylindrical bearing housing member 25. The outer member 24 is provided with a flange 24ª intermediate its ends, which flange rests upon a seating surface in the frame member 16, as shown. The inner member 25 is provided with a flange 25ª intermediate its ends and a threaded locking ring 26 by means of which the anti-friction race members are locked in place, as shown. The inner member 25 has a central passage through it which is internally threaded, as shown at 29, to receive the threaded end of a tubular tie rod 27 which passes through a central passage in the member 21. The tubular tie rod 27 is provided with a wrench head 28.

Extending through a central passage in the tie rod 27 is a bolt 30 which has on its inner end a contact piece 31 which can be mounted thereon in any suitable way, as by means of threads. A compression spring 32 lies between the contact piece 31 and the end of a recess in the end of the tubular tie rod 27, so as to hold the head of the bolt 30 against the end of the tie member 27, as shown in this figure.

Seated in the outer end of the bearing housing passage in the frame member 16 is a cover plate 50 which is secured to the end of member 24 by means of cap screws, as shown. This locks the assembly 24 in the side frame member 16 against axial movement. Recessed in a central opening in the cover plate 50 is a cylindrical plug 33 having a central passage therethrough. Slidably mounted in this passage is an insulating rod 34 on the end of which is a contact piece to cooperate with the contact piece 31. Mounted on the insulating rod 34, by means of a cap screw 36, is a metallic contact 35 to which a circuit wire W is attached. A compression spring 48 is positioned so as to urge the contact piece on the rod 34 to the left, so as to tend to cause the contact washer 35 to engage the cylindrical plug 33, which is of metal as are all the other parts of this structure with the exception of the rod 34. However, in a static condition the relative strength of spring 32 is such that rod 30 will be held in the position shown, thereby engaging the contact piece on the rod 34 to hold the contact disc 35 out of engagement with the other circuit terminal comprising the contact plug 33 against the resistance of the lighter spring 48.

Mounted on the inner end of the member 21 is a conical spool supporting member 37, which is secured to the member 21 by means of screws, as shown. In a similar way a conical spool supporting member 38 is secured on the inner end of the member 25. A type of spool useful with a machine of this kind consists of a central core member 39 and a pair of circular heads 40 secured thereto.

Secured to the conical member 38 by means of screws, as shown, is a grooved wheel 41 which forms part of a braking device commonly used in machines of this type, but forming no part of this invention. A pin 42 is secured with the grooved wheel 41 in a position so as to project through an aperture in the adjacent spool head, as shown in Figure 3, so as to cause the spool to rotate with the assembly.

Figure 2:
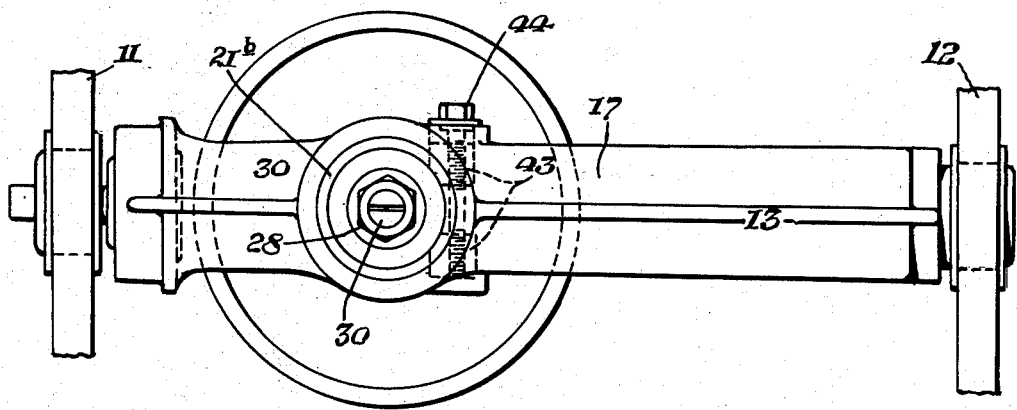
Figure 2 is a side elevational view of the spool cradle.

In order to lock the bearing assembly 19 in operating position any suitable form of clamping mechanism can be used such as that, for example, shown in Figure 2. The frame member 17 is provided with a suitable chamber in which are mounted a pair of blocks 43 which are arranged to extend through slots in the bushing 18, so that they may be brought into contact with the outer member 20 of the bearing assembly. A bolt 44 having reversely threaded portions threadedly engages the upper and lower blocks 43. When the bolt 44 is drawn up tight the two gripping blocks 43 will be drawn towards each other, and thereby forced into firm contact with the outer housing member 20 of the bearing assembly 19.

As will be understood by those skilled in the art, suitable sealing rings S will be used, as indicated in Figure 3.

In order to remove a spool from a cradle having the construction described above, it is necessary to remove the tubular tie rod 27. This is accomplished by placing a wrench on the head 28 so as to disengage threads 29. The tie member 27 is then withdrawn and with it is removed the inner rod 30, the spring 32 and the contact piece 31. The clamping blocks 43 are released, with the result that the bearing assembly 19 is unlocked and can then be slid axially by the cooperation of the threaded pin 32 and slot construction 22. This causes the conical supporting member 37 to move to the left, Figure 3, so that the spool can be removed and a new loaded spool can be seated at one end on the conical nose piece 38, thereupon the bearing assembly 19 can be pushed to the right to cause the conical nose piece 37 to engage the other end of the spool. As shown in Figure 3, the hollow core member of the spool is preferably provided with conical seats as shown, so as to mate with the conical nose pieces 37 and 38 over a substantial area. The tubular tie rod 27 is then passed through the assembly and rotated to cause the threads 29 to engage and pull the bearing assembly 19 to the right until the spool is firmly seated on the nose pieces. The spool is rotationally positioned so that the aperture in the adjacent head can pass over the pin 42 in the grooved wheel 41. When the parts are drawn up tightly the bolt 44 is drawn up to cause the clamping members 43 to further lock the bearing assembly 19 against axial movement. It is, of course, apparent that the tubular tie rod 27 contributes to this locking action, but it is important to lock the bearing assembly 19 to the frame by the clamping blocks 43.

With the parts thus assembled it will be seen that the circuit which would include the contact piece 35 and the frame of the machine is open. This circuit, not here shown, will be included in the main motor drive circuit or a control circuit therefor to provide stopping control in the event that due to breakage of rod 27 spring 48 can close the switch 35—33. This condition can only occur in the event that while the machine is running the tubular tie rod 27 breaks for any reason. The switch will also close if the tie rod 27 works loose or the machine operates at an excessive speed.

From the above description it will be apparent that the tubular tie rod 27 provides a cross connection between the side frame members 16 and 17 of spool cradle 13. The result is that as the machine rotates that frame member of the pair 16 and 17 which is taking the load at the moment, will be cross connected with the other frame member, so that the stresses which are present will not all be carried by one frame member, but will be divided substantially between the two frame members. This permits for a given speed of rotation of the machine of making the cradles of a lighter construction. To state it another way, this arrangement permits for any strength of cradle construction a higher speed of rotation.

At the same time the construction described permits of ease in mounting the loaded spools and removing them when they are empty. The arrangement is such that the spool can be accurately positioned and clearly locked against looseness and side slap, which is likely to occur in a machine of this type unless the spool is firmly seated. If for any reason the spool gets loose without breakage of the tubular tie rod 27, that rod will make impossible the escape of the spool from the machine, which is obviously a hazardous and disastrous possibility.

For the sake of terminology it may be noted that the inner race supporting members 21 and 25 with their conical nose pieces 37 and 38 respectively, form rotatable spool supporting pintles. It will also be appreciated that the tie rod 27 in interconnecting the side frame members will preload them and place the tubular tie rod under tension.

It will be noted from Figure 3 that in a construction of this type when the tie bar 27 is drawn up tight the bearings will not be preloaded. It is further apparent that when the slidable bearing assembly 19 is locked in the frame member 17, the tie bar 27 becomes effective to distribute the loadings due to centrifugal force between the side frame members as previously suggested.

While applicant has disclosed a control switch for effecting shut down of the machine, it is apparent to those skilled in the art that other types of control devices may be used to accomplish a similar purpose. They are, therefore, considered to be within the scope of this invention.

From this description of one embodiment of the invention herein disclosed it is apparent that the main objects of this invention are easily accomplished as well as a number of subsidiary objects which those skilled in the art will appreciate from experience. Since the details of construction of this invention are capable of wide variation, it is not my desire to be limited to the embodiment selected for illustrative purposes, but prefer limitation only as required by the claims granted me.

What is claimed is:

1. In a cable stranding machine, a rotatable spool cradle having a pair of side members, a pair of rotatable spool supporting pintle assemblies, one fixed to one side member and the other slidably mounted in the other side member, means for clamping the latter in said side frame member, a tubular tension bar interconnecting the pintle assemblies, and a control device lying in part in said tubular tension bar for initiating stoppage of the machine in the event the tension bar breaks or becomes loose.

2. In the combination of claim 1, said tension bar passing through the slidable pintle assembly and being threadedly connected to the other pintle assembly.

3. In the combination of claim 1, said control device including a rod extending through said tubular tension bar and being resiliently urged in one direction.

4. In the combination of claim 1, said control device comprising a switch structure consisting of a fixed contact, a movable contact slidably mounted on a rod lying on the axis of said tubular tension bar, and means for resiliently urging said rod towards that fixed contact.

5. In the combination of claim 1, said control device comprising a switch consisting of a fixed contact and a movable contact resiliently urged into contact therewith.

6. In the combination of claim 1, said control device comprising a spring loaded switch.

References Cited in the file of this patent

UNITED STATES PATENTS

| Number | Name | Date |
|---|---|---|
| 960,913 | Heaniy | June 7, 1910 |
| 1,106,899 | Staples | Aug. 11, 1914 |
| 2,294,634 | Scott et al. | Sept. 1, 1942 |

FOREIGN PATENTS

| Number | Country | Date |
|---|---|---|
| 349,202 | Great Britain | May 28, 1931 |
| 653,919 | Germany | Dec. 6, 1937 |